Jan. 6, 1942.  W. F. ALLENBY  2,269,170
COUPLING
Filed May 3, 1940
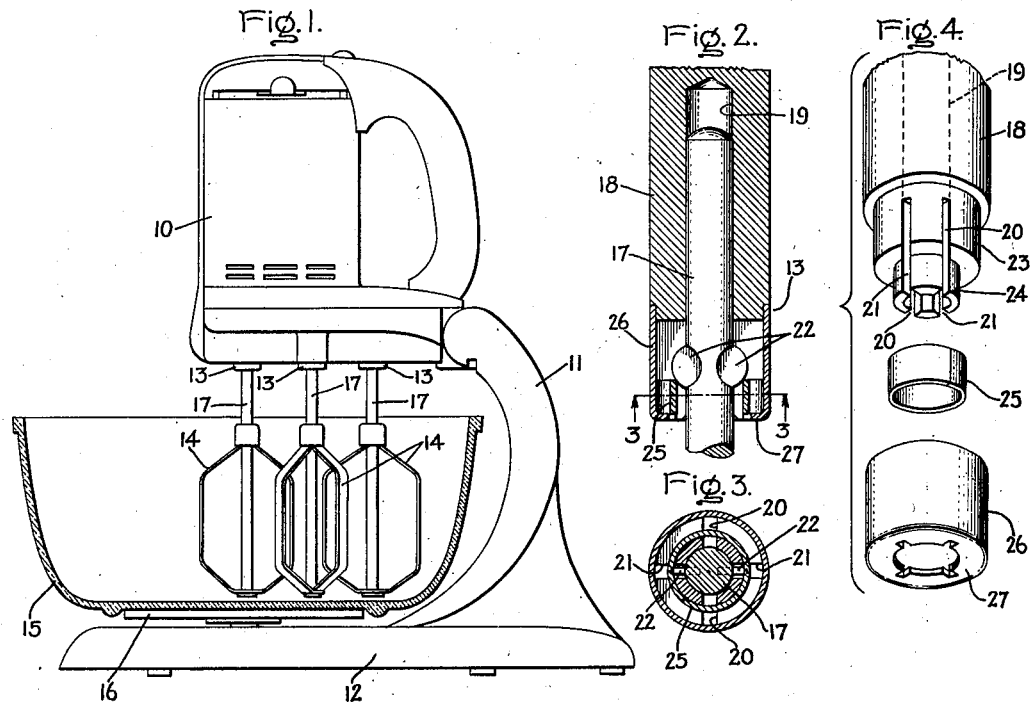
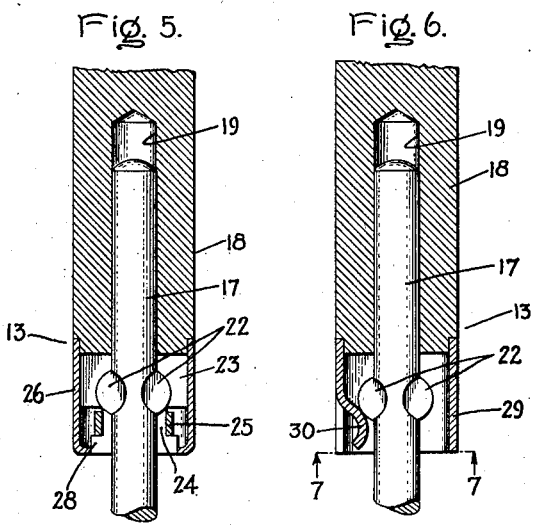
Inventor:
William F. Allenby,
by Harry E. Dunham
His Attorney.

Patented Jan. 6, 1942

2,269,170

UNITED STATES PATENT OFFICE 2,269,170

COUPLING

William F. Allenby, Stratford, Conn., assignor to General Electric Company, a corporation of New York Application May 3, 1940, Serial No. 333,179

4 Claims. (Cl. 287—119)

This invention relates to couplings and more particularly to couplings for effecting a driving connection between a driving shaft and a driven shaft and it has for its object an improved device of this character.

This invention is particularly applicable to power driven household mixing devices and it contemplates an improved coupling for effecting the driving connection between the beating or mixing tool shaft and the driving shaft of the mixing device.

It is a specific object of this invention to provide an easily manipulated, inexpensive, and relatively durable coupling for effecting a driving connection between the beater tool shaft and power driven spindle of a houshold mixing device.

In accordance with this invention the driving shaft and the beater tool shaft, that is the driven shaft, are fitted together in telescopic relation, one shaft being provided with lugs or projections which are received in slots provided in the other shaft. Mounted on the shaft having slots therein is a resilient locking member which is arranged so that on inserting the lugs in their respective slots they are forced past the resilient locking member and the beater tool shaft is positively held in engagement with the driving shaft. Thus, by a simple vertical movement it is possible readily to engage and disengage the driving and driven shafts.

For a more complete understanding of this invention, reference should be had to the accompanying drawing in which Fig. 1 is a side elevation of a food mixing device provided with the improved couplings of this invention between the beater tools and the driving shafts of the device; Fig. 2 is an enlarged fragmentary sectional view illustrating one form of the improved coupling arrangement of this invention; Fig. 3 is a sectional view taken on the line 3—3 of Fig. 2 looking in the direction of the arrows; Fig. 4 is an exploded view showing the component elements of the form of coupling shown in Fig. 2; Fig. 5 is a view similar to Fig. 2 showing an alternative construction for holding the resilient locking ring in position; Fig. 6 is an enlarged fragmentary sectional view showing a modified coupling arrangement; and Fig. 7 is a view taken on the line 7—7 of Fig. 6 looking in the direction of the arrows.

Referring to the drawing, this invention has been shown in one form as applied to a coupling for connecting the beater elements of a household mixing device to their drive shaft or spindles. As shown in the drawing, the food mixing device comprises a power unit 10 mounted upon a suitable standard 11 having a base 12. The power unit 10 is provided with three spaced driving shafts or spindles 13 for driving three beater elements 14. These elements are arranged to operate in a bowl 15 which is adapted to be separately supported on a turntable 16 rotatably mounted on the base 12 of the supporting standard.

Each of the beater elements 14 comprises a shaft 17 which is arranged to be operated by one of the driving spindles 13. One form of the improved coupling means of this invention for effecting a driving connection between the spindle 13 and the shaft 17 is shown in detail in one form in Figs. 2, 3 and 4. As shown in these figures, each driving shaft or spindle 13 has a tubular section 18 at its lower end defining an opening 19 which is arranged to receive the upper end portion of the shaft 17 in telescopic relation. Provided adjacent the lower end of the tubular section 18 are slots 20 and 21 which are cut across diameters lying at 90 degree angles to each other; thus dividing the end of the tubular section in quadrants. These slots 20 and 21 are arranged so as to receive oppositely positioned driving lugs 22 provided on the upper end of each of the shafts 17. The cooperation of the lugs 22 with either the slot 20 or the slot 21 forms a driving connection between the spindle 13 and the shaft 17. By providing the two slots 20 and 21 arranged at right angles to each other, the pair of oppositely positioned driving lugs 22 may be readily and easily inserted in either the slot 20 or the slot 21 depending upon the relative position of the driving shaft 13, thus making possible four positions of the beater elements 14.

Provided at the slotted portion of the tubular end of the spindle are two portions 23 and 24 of reduced diameter. The portion 24 is machined so that its outside diameter is less than the distance between the outside edges of the lugs 22. Thus, when the lugs are inserted in either the slot 21 or the slot 20 in this portion of the spindle, the outside edges of the lugs will project a slight amount beyond the periphery of the portion 24. The diameter of the portion 23, on the other hand, is greater than the distance between the outside edges of the lugs 22. Fitted over the periphery of the portion 24 so as to lie in close proximity thereto is a split circular resilient band or ring 25. This band is made from some suitable resilient material and is made relatively wide so that its durability and life and hence the durability and life of the coupling arrangement are substantially improved. Pressed on the reduced portion 23 of the spindle is a ferrule 26 having an inwardly extending flange 27. This ferrule is arranged to support the resilient ring 25 in its operative position between the flange 27 and the shoulder formed between the spindle portions 23 and 24. In mounting and supporting the ring 25 in its operative position sufficient clearance is provided to permit the ring to function without binding. As shown in Fig. 4, the flange 27 is slotted to conform with slots 20 and 21 so that driving lugs 22 on shaft 17 may enter without interference.

The ferrule 26 also performs an oil sealing function for it acts as a barrier to the flow of oil from the spindle bearing into the slots 20 and 21 from where it could get upon the beater shaft and hence into the food being mixed. This oil sealing function may be assisted by providing in the power unit casing suitable felt washers (not shown) which fit tightly against the upper portion of the ferrule.

Considering the operation of the above-described form of this invention, it will be observed that upon inserting the shaft 17 in the opening 19 of the spindle 13 the lugs 22 will engage either the slot 20 or 21 depending upon the position of the spindle and upward movement of the lugs 22 through the portion 24 of the spindle causes the outer edges of the lugs to engage and stress the split ring 25 outwardly to a non-locking position. However, when the lugs reach the position shown in Fig. 2, the ring 25 will contract to its unstressed position in which position it forms a barrier to downward movement of the lugs and thus supports or locks the shaft 17 in its driving relationship with the spindle 13. To disengage the shaft from the spindle it is merely necessary to pull downwardly on the shaft 17. This downward force causes the lugs 22 again to stress the ring 25 outwardly to a non-locking or barring position permitting the lugs to be removed from the slot 20 or 21, as the case may be, and the shaft to be removed from the spindle. When the lugs are removed from the particular slot in which they are received the ring 25 will reutrn to its unstressed position.

In Fig. 5 I have shown an alternative arrangement for supporting the split ring 25 in position on the end of the tubular section 18 of the spindle 13. In this arrangement a head 28 is formed on the end of the spindle and this head cooperates with the reduced portions 23 and 24 to define a groove in which the ring member 25 is adapted to lie. In this alternative form, it will be observed that the ferrule 26 does not support the resilient ring 25 and this alternative arrangement has the advantage that any looseness in the fit of the ferrule will not affect the functioning of the resilient ring 25.

In Figs. 6 and 7 I have shown a further modified form of my improved coupling arrangement. In this form the resilient ring 25 is eliminated and the construction of the end of the spindle is somewhat simplified. As shown in these two figures, the lower end of the spindle is provided with the slots 20 and 21 and pressed over the slotted end of the spindle is a ferrule 29. This ferrule 29 is made from some suitable resilient material and is provided with two depressed spring fingers 30 and 31 which, as shown in Fig. 7, are spaced 90 degrees from each other so as to lie in adjacent portions of the slots 20 and 21. These spring fingers 30 and 31 are adapted to be engaged and pressed outwardly by the driving lugs 22 upon the insertion of the shaft 17 in the opening 19 of the tubular section of the driving shaft. When the lug 22 passes beyond the spring finger to the position shown in Fig. 6, the finger springs inwardly under the lug to hold the beater shaft 17 in position. Thus the shafts are resiliently and detachably coupled together and may be readily separated by a downward movement of the beater shaft 17. By arranging the spring fingers 30 and 31 at 90 degree angles to each other one spring finger lies in each of the slots 20 and 21 so that the shaft 17 is latched in position in the spindle 13 irrespective of the particular slot that the lugs 22 happen to engage.

From the foregoing it will be observed that there is provided in accordance with this invention improved coupling arrangements for coupling the driving and driven shafts of a household mixing device, the coupling arrangements described being characterized by their simplicity and the ease with which they can be manipulated. It is to be particularly observed that the driving and driven shafts of the mixing device may be readily connected or disconnected by a simple upward or downward movement of the beater element and it is not necessary to turn or push any auxiliary locking key or screw.

While particular embodiments of this invention have been shown and described, it will be understood that this invention is not limited thereto since many other modifications may be made therein and it is therefore intended to cover in the appended claims all modifications which are within the true spirit and scope of this invention.

What I claim as new and desire to secure by Letters Patent of the United States is:

1. In a mixing device and the like, a tubular driving spindle having slots in one end thereof and a portion of reduced diameter at said slotted end, a tool having a shaft insertable in said spindle, lugs on said shaft adapted to be received in said slots in said spindle so as to form a driving connection between said shaft and said spindle, the distance between the outer edges of said lugs being slightly greater than the diameter of said reduced portion, and a resilient ring engaging said lugs to support said shaft in said spindle, said ring being mounted on said portion of reduced diameter and being moved to a non-supporting position by said lugs during insertion or removal of said shaft from said spindle.

2. In a food working device or the like, a spindle having slots adjacent one end, a shaft insertable into said spindle, lugs on said shaft engaging said slots so as to form a driving connection between said shaft and said spindle, and resilient means for locking said shaft in said spindle, said means comprising a portion of reduced diameter on said spindle having a diameter less than the distance between the outer edges of said lugs so that said outer edges of said lugs extend beyond the periphery of said portion of reduced diameter, a resilient ring closely fitting the periphery of said portion of reduced diameter so that when said spindle and driven shaft are in driving relation, said ring engages the under surface of said lugs to latch said shaft in said spindle and when said shaft is moved into or out of said spindle said ring is stressed outwardly by said lugs and moved to a non-latching position, and means on said spindle for supporting said resilient ring on said portion of reduced diameter.

3. In a mixing device and the like, a tubular driving spindle having slots therein, a tool having a shaft insertable in said spindle, projecting lugs on said shaft adapted to cooperate with said slots to form a driving connection between said shaft and said spindle, a portion of reduced diameter adjacent the lower end of said spindle, the diameter of said portion being slightly less than the distance between the outside edges of said lugs so that upon insertion of said lugs in said slots a portion thereof will extend beyond the outer periphery of said portion of the spindle, a resilient ring mounted on said portion of reduced diameter, said resilient ring engaging the under side of said lugs to lock said shaft in its driving relation with said spindle yet being free to be moved outwardly to a non-locking position by said lugs upon movement of said shaft into and out of said spindle, and a ferrule on said spindle for supporting said resilient ring on said portion of reduced diameter.

4. In combination, a tubular driving spindle, a portion of reduced diameter on said spindle having radially extending slots therein, a shaft movable into said spindle, a projecting lug on said shaft adapted to be moved selectively into said slots to provide a driving connection between said shaft and said spindle, said lug having a radial width greater than the radius of said reduced portion so that a portion of said lug projects out of said slot in which it is received, a resilient member surrounding said reduced portion so as to be engaged by said projecting portion of said lug irrespective of the slot with which it is cooperating, means for supporting said resilient member against substantial axial movement relative to said reduced portion of said spindle, said means permitting radial movement of said resilient member so that said member may be stressed outwardly by said lug upon movement of said shaft into said spindle, said resilient member having a height less than the depth of said slots so that upon movement of said shaft into said spindle said lug can be moved past said resilient member permitting said resilient member to return to its normal position whereby said shaft and spindle are held in driving relation by engagement of said resilient member with the under side of said projecting portion of said lug.

WILLIAM F. ALLENBY.